(12) United States Patent
Tomson et al.

(10) Patent No.: US 12,480,034 B2
(45) Date of Patent: Nov. 25, 2025

(54) EXTENDED RELEASE COLLOIDAL SCALE INHIBITOR

(71) Applicant: Tomson Technologies LLC, Houston, TX (US)

(72) Inventors: Ross Tomson, Houston, TX (US); Paula Guraieb, Houston, TX (US); Rangana Jayawickramage, Houston, TX (US); Kyle Swanson, Houston, TX (US)

(73) Assignee: CHAMPIONX LLC, Sugar Land, TX (US)

( * ) Notice: Subject to any disclaimer, the term of this patent is extended or adjusted under 35 U.S.C. 154(b) by 10 days.

(21) Appl. No.: 17/599,373

(22) PCT Filed: Mar. 30, 2020

(86) PCT No.: PCT/US2020/025738
§ 371 (c)(1),
(2) Date: Sep. 28, 2021

(87) PCT Pub. No.: WO2020/205747
PCT Pub. Date: Oct. 8, 2020

(65) Prior Publication Data
US 2022/0145162 A1    May 12, 2022

Related U.S. Application Data

(60) Provisional application No. 62/826,369, filed on Mar. 29, 2019.

(51) Int. Cl.
*C09K 8/536* (2006.01)
*C09K 8/03* (2006.01)
(Continued)

(52) U.S. Cl.
CPC ............ *C09K 8/536* (2013.01); *C09K 8/032* (2013.01); *C09K 8/035* (2013.01); *C09K 8/584* (2013.01); *E21B 43/16* (2013.01); *C09K 2208/10* (2013.01)

(58) Field of Classification Search
CPC .......... C09K 8/032; C09K 8/52; C09K 8/528; C09K 2208/10
See application file for complete search history.

(56) References Cited

U.S. PATENT DOCUMENTS 5,089,150 A   2/1992   Hen
5,964,291 A   10/1999  Bourne et al.
(Continued)

FOREIGN PATENT DOCUMENTS

WO   WO 2008/030758   3/2008
WO   WO 2010/081480   7/2010
(Continued)

OTHER PUBLICATIONS

Haghtalab et al., "Evaluation of the Effective Parameters in Synthesis of the Nano-Structured Scaling Inhibitors Applicable in Oil Fields with Sea Water Injection Process", Journal of Nanoparticle Research, 14, (2012), pp. 1210-1221.
(Continued)

*Primary Examiner* — Aiqun Li
(74) *Attorney, Agent, or Firm* — NORTON ROSE FULBRIGHT US LLP

(57) ABSTRACT

Nano-sized metal silica oxide carriers capable of delivering a well treatment additive for a sustained or extended period of time in the environment of use, methods of making the nanoparticles, and uses thereof are described herein. The nanoparticles include an additive loaded in a silica oxide/metal nanoparticle. The metal can be a Column 2 metal, a Column 14 metal, or transition metal.

17 Claims, 6 Drawing Sheets

(51) Int. Cl.
  *C09K 8/035* (2006.01)
  *C09K 8/584* (2006.01)
  *E21B 43/16* (2006.01)

(56) References Cited

U.S. PATENT DOCUMENTS

| | | | |
|---|---|---|---|
| 6,693,071 | B2 | 2/2004 | Ghosh et al. |
| 7,422,759 | B2 | 9/2008 | Kepner et al. |
| 7,491,682 | B2 | 2/2009 | Gupta et al. |
| 7,493,955 | B2 | 2/2009 | Gupta et al. |
| 8,822,386 | B2 | 9/2014 | Quintero et al. |
| 2004/0023824 | A1 | 2/2004 | Züechner et al. |
| 2008/0058229 | A1* | 3/2008 | Berkland .......... C09K 8/60 507/211 |
| 2008/0138538 | A1 | 6/2008 | Lewis et al. |
| 2009/0312201 | A1 | 12/2009 | Huang et al. |
| 2010/0314108 | A1 | 12/2010 | Crews et al. |
| 2012/0015852 | A1 | 1/2012 | Quintero et al. |
| 2013/0341028 | A1 | 12/2013 | Christin et al. |
| 2014/0338915 | A1 | 11/2014 | Ferm et al. |
| 2015/0027699 | A1 | 1/2015 | Louiseau et al. |
| 2015/0129225 | A1* | 5/2015 | Ghorbani .......... F24F 11/77 507/219 |
| 2017/0174978 | A1 | 6/2017 | Giro et al. |

FOREIGN PATENT DOCUMENTS

| | | |
|---|---|---|
| WO | WO 2012/009128 | 1/2012 |
| WO | WO 2012/148819 | 11/2012 |
| WO | WO 2012/154332 | 11/2012 |
| WO | WO 2017/208096 | 12/2017 |

OTHER PUBLICATIONS

International Search Report and Written Opinion issued in Corresponding PCT Application No. PCT/US2020/025738, dated Jul. 29, 2020.

Kiaei et al., "Experimental Study of Using Ca-DTPMP Nanoparticles in Inhibition of CaCO3 Scaling in a Bulk Water Process", Desalination, 338, (2014), pp. 84-92.

Shen et al., "Control Placement of Scale Inhibitors in the Formation With Stable Ca-DTPMP Nanoparticle Suspension And Its Transport in Porous Medium", Society of Petroleum Engineers, (2008).

Watanabe et al. "Synthesis of Nano-sized Boehmites for Optimum Phosphate Sorption", Separation Science and Technology, 46.5, (2011), pp. 818-824.

Yan et al., "Boehmite Based Sulphonated Polymer Nanoparticles with Improved Squeeze Performance for Deepwater Scale Control", Offshore Technology Conference, (2013).

Yan et al., "Synthesis and Sorption Study of AlOOH Nanoparticle-Crosslinked Polymeric Scale Inhibitors and Their Improved Squeeze Performance in Porous Media", Offshore Technology Conference, (2013).

Yan, et al., "Synthesis and Size Control of Monodispersed Al-sulphonated Polycarboxylic Acid (Al-SPCA) Nanoparticles with Improved Squeeze Performance and Their Transport in Porous Media", Society of Petroleum Engineers, (2012).

Zhang et al., "Enhanced transport of novel crystalline calcium-phosphonate scale inhibitor nanomaterials and their long term flow back performance in laboratory squeeze simulation tests", RSC Advances, 6, (2016), pp. 5259-5269.

Zhang et al., "Silica-Templated Synthesis of Novel Zinc-DTPMP Nanomaterials: Their Transport in Carbonate and Sandstone Media During Scale Inhibition", Society of Petroleum Engineers, 19:3, (2011).

Zhang et al., "Surfactant-Assisted Synthesis of Metal-Phosphonate Inhibitor Nanoparticles and Transport in Porous Media", Society of Petroleum Engineers, 15:3, (2010).

Zhang et al., "Synthesis of Crystalline-Phase Silica-Based Calcium Phosphonate Nanomaterials and Their Transport in Carbonate and Sandstone Porous Media", Ind. Eng. Chem. Res., 50:4, (2011), pp. 1819-1830.

\* cited by examiner

EXTENDED RELEASE COLLOIDAL SCALE INHIBITOR

CROSS REFERENCE TO RELATED APPLICATIONS

This application is a national phase application under 35 U.S.C. § 371 of International Application No. PCT/US2020/025738, filed Mar. 30, 2020, which claims the benefit of U.S. Provisional Application 62/826,369, filed Mar. 29, 2019. The contents of each of the referenced applications are incorporated into the present application by reference.

BACKGROUND OF THE INVENTION

A. Field of the Invention

The invention generally concerns nanoparticle carrier platforms to controllably release well treatment additives (e.g., scale inhibitors) to subterranean gas, oil, or water wells, or subterranean formations. The nanoparticles can be made of a silica/metal oxide.

Subterranean well treatment additives can be loaded onto the surface, impregnated within the nanoparticles, or bound to the nanoparticles.

B. Description of Related Art

Chemical carrier platforms can be used in the subterranean drilling industry to deliver subterranean well treatment additives. By way of example, scale inhibitors can be injected into the subterranean well to try to extend the time period over which such additives are released. Controlled or extended release of additives from the carrier platforms is desirable in order to avoid or eliminate retreatment of the well, as retreatment is costly and time consuming.

There are also safety and environmental risks involved with each treatment. In particular, scale inhibitors used to prevent or to control scale depositions in subterranean wells can be delivered by a process known as a "squeeze treatment". In scale-inhibitor squeeze, the inhibitor can be attached to the formation matrix by chemical adsorption or by temperature-activated precipitation and returns with the produced fluid at sufficiently high concentrations to avoid scale precipitation. Scale inhibitor chemicals can be continuously injected through a downhole injection point in the completion, or periodic squeeze treatments can be undertaken to place the inhibitor in the reservoir matrix for subsequent commingling with produced fluids. Some scale inhibitor systems integrate scale inhibitors and fracture treatments into one step. In this type of treatment, a scale inhibitor can be pumped into the formation, adsorbs to the matrix during pumping and then release when the fracture begins to produce water. As the water passes through the inhibitor-adsorbed zone, it dissolves the inhibitor to prevent scale nucleation and deposition of salts in the well. A commercially available scale inhibitor system is sold under the name Scaleguard® (from Carbo Ceramics, Inc., Houston, TX). This system includes a porous ceramic proppant impregnated with a scale inhibitor which releases the scale inhibitor upon contact with water for slow release in fractured wells via a semipermeable coating.

Various scale inhibitors systems have been investigated to improve the delivery of additives to a hydrocarbon producing well. By way of example, Shen et al. (*SPE International Oilfield Scale Conference*. Society of Petroleum Engineers, 2008) describes calcium-diethylenetriamine penta(methylenephosphonate)(Ca-DTPMP) nanoparticle suspensions for the controlled placement of scale inhibitors in a formation and transport of the scale inhibitors in a porous medium. Boehmite based sulfonated polymer nanoparticles have been described by Yan et al. (*Offshore Technology Conference*. Offshore Technology Conference, 2013), while the production of nano-sized boehmites for phosphate sorption has been described by Wantanbe et al. (*Separation Science and Technology* 46.5 (2011): 818-824).

Other attempts to improve release of scale inhibitors into a well include crosslinking polymeric scale inhibitors with aluminum oxide hydroxide (AlO(OH)) or α-aluminum oxide hydroxide (α-AlO(OH)) (See, for example, Yan et al. *SPE International Symposium on Oilfield Chemistry, Society of Petroleum Engineers*, 2013 and Yan et al. *SPE Journal* 19.04 (2014): 687-694). Zhang et al. describes crystalline phase calcium-phosphonate scale inhibitor nanomaterials prepared from amorphous silica templated calcium-phosphonate precipitates (*RSC ADV.* 2016, 6, 5259-5269 and *Ind. Eng. Chem. Res.* 2011, 50(4), pp. 1819-1830).

Still further, other additives have been combined with scale inhibitors for well treatment. By way of example, antimicrobial compositions in combination with scale inhibitors made from various possible combinations of metal oxides is described in U.S. Pat. No. 7,422,759 to Kepner et al.

Despite the foregoing, the above mentioned nanoparticle carriers suffer from inadequate controlled release of the subterranean treatment additives over an extended period of time from the currently available carrier platforms, leading to the need for retreatments, increased environmental risks, and economic losses.

SUMMARY OF THE INVENTION

A discovery has been made that solves the problems associated with treating subterranean formations (e.g., reservoirs) or wells (e.g., oil, gas and water wells) with well treatment additives (e.g., scale inhibitors). The solution resides in the development of a silica/metal oxide nanoparticle, preferably a metal oxide nanoparticle that is loaded with a well treatment additive. The releasable hydrocarbon formation and/or well treatment additive is attached to silica/metal oxide and has a particle size of less than 300 nm. The metal can be a Column 2 metal or a transition metal. In a preferred embodiment, the metal is calcium. The nanoparticle can have a general structure of $A/[Si_xM_z]O_n$ where M are in the crystal lattice structure of the nanoparticle, and A is the well treatment additive that can be slowly released from the nanoparticle. Surprisingly, this structural set-up allows for a slow release profile of the additive, such that the additive can be released from the nanoparticle over an extended period of time (e.g., at least for 10 days to 10 years or more, 500 days, at least for 1000 days, at least for 2000 days, at least for 500 days to 2500 days, or at least for 500 days to 2000 days after well treatment) during use. The time the nanoparticle continues to return meaningful concentrations of inhibitor can vary depending on the water production rate of the well. This, in turn, reduces the costs, expenses, and overall inefficiencies with having to perform continuous or more periodic well treatments such as with the processes currently used in the well-treatment industry. Without wishing to be bound by theory, it is believed that by having the metals of the mixed metal oxide nanoparticle present in the crystal lattice, more efficient loading (e.g., adsorption or chemical bonding) of the well treatment additive into the crystal lattice can take place. Such loading can provide for a more controllable or slower dissolution or desorption of the additive into an aqueous environment and inhibit leaching of the treatment additive from the nanoparticle, thereby providing the prolonged release profile of the additive during use. The nanoparticle of the present invention, as exemplified in a non-limiting manner in the Examples, as compared to in incumbent additive at the same dosage had higher SI return concentration, higher efficacy throughout the treatment life, re-squeeze times were significantly extended and higher return per active inhibitor unit. An aqueous solution of nanoparticles of the present invention are stable (i.e. no precipitation and/or change in particle nanoparticle size) at temperatures of −20° C. to 200° C. and/or pH of 5 to 9, preferably 7.1 to 8.6. The nanoparticles of the present invention are resistant to shear stress (e.g., no precipitation of particles after being subject to shear). Further the nanoparticles do not hinder or inhibit emulsion separations.

In one aspect of the present invention, nanoparticle that include a releasable hydrocarbon formation and/or well treatment additive attached to the nanoparticle are described. The nanoparticle can include silica and at least one Column 2, Column 14, or transition metal, or combinations thereof complexed to the silica ($M-SiO_2$). The nanoparticle can have a particle size of less than 300 nm (e.g. 0.1 nm to 300 nm, preferably 10 to 250 nm). In a preferred embodiment, the metal is calcium (Ca) (e.g., $Ca-SiO_2$). The hydrocarbon formation and/or well treatment additive can be scale inhibitor, a hydrate inhibitor, a clay stabilizer, a bactericide, a salt substitute, a relative permeability modifier, a sulfide scavenger, a corrosion inhibitor, a corrosion inhibitor intensifier, a pH control additive, a surfactant, a breaker, a fluid loss control additive, an asphaltene inhibitor, a paraffin inhibitor, a chelating agent, a foamer, a defoamer, an emulsifier, a demulsifier, an iron control agent, a solvent, a friction reducer, or any combination thereof. Scale inhibitors can include an organic molecule having a carboxylic acid, a polycarboxylic acid, aspartic acid, maleic acid, sulfonic acid, phosphonic acid, or a phosphate ester group or salts thereof. The scale inhibitor can include a phosphonic acid functionality. In preferred aspects, the scale inhibitor can include or is diethylenetriamine penta(methylene phosphonic acid) (DTPMPA), bis(hexamethylenetriaminepenta(methylenephosphonic acid)) (BHMTPMP), ethylene diamine tetra (methylene phosphonic acid) (EDTMPA), amino trimethylene phosphonic acid (ATMP), polyamino polyether methylene phosphonic acid (PAPEMP), hydroxyethyl-amino-di(methylene phosphonic acid) (HEMPA), or a combination thereof, more preferably DTPMPA or HEMPA, or both. In some instances, the scale inhibitor can include or is 1-hydroxy ethylidene-1,1-diphosphonic acid (HEDP), 2-phosphonobutane-1,2,4-tricarboxylic acid (PBTC), 2-hydroxy phosphonoacetic acid (HPAA), or any combination thereof. In a preferred embodiment, the additive is DTPMPA and the nanoparticle is $SiO_2-Ca$. The hydrocarbon formation and/or well treatment additive can be impregnated within the nanoparticle. In some instances, the hydrocarbon formation and/or well treatment additive can be chemically bound to the nanoparticle through an ionic bond, a covalent bond, a hydrogen bond, a Van der Walls interaction, or by adsorption onto the particle. The additive can be capable of being released from the nanoparticle in a controlled manner over an extended period of time such as at least for 500 days, at least for 1000 days, at least for 2000 days, at least for 500 days to 2500 days, or at least for 500 days to 2000 days after application.

In another aspect of the invention, the nanoparticle can have a formula of $A/[Si_xM_z]O_n$ where Si and M are in the crystal lattice structure of the nanoparticle, M is a Column 2 metal, a transition metal, a Column 14 metal, or any combination thereof; x is 0.03 to 3, z is 0.01 to 0.4, and n is determined by the oxidation states of the metals Si, M; and A can be the hydrocarbon formation or well treatment additive capable of being released from the nanoparticle described above.

In preferred aspects, the present invention relates to nanoparticles that allow for extended release of subterranean well treatment additives, e.g., scale inhibitors. As discussed above and throughout the specification, the additive can be bound to the nanoparticle or otherwise adhered to the nanoparticle. The additive can be a scale inhibitor that is an organic molecule having a carboxylic acid, a polycarboxylic aspartic acid, maleic acid, sulfonic acid, phosphonic acid, or a phosphate ester group. In particularly preferred embodiments, the scale inhibitor can include a phosphonic acid functionality. In preferred aspects, the scale inhibitor can include or is diethylenetriamine penta(methylene phosphonic acid) (DTPMPA), bis(hexamethylenetriaminepenta(methylenephosphonic acid)) (BHMTPMP), ethylene diamine tetra (methylene phosphonic acid) (EDTMPA), amino trimethylene phosphonic acid (ATMP), polyamino polyether methylene phosphonic acid (PAPEMP), hydroxyethyl-amino-di(methylene phosphonic acid) (HEMPA), or a combination thereof, more preferably DTPMPA or HEMPA, or both. In some instances, the scale inhibitor can include or is 1-hydroxy ethylidene-1,1-diphosphonic acid (HEDP), 2-phosphonobutane-1,2,4-tricarboxylic acid (PBTC), 2-hydroxy phosphonoacetic acid (HPAA), or any combination thereof.

Also disclosed are methods of producing the nanoparticles. The method can include contacting a metal salt solution that includes a Column 2 metal salt, a Column 14 metal salt, a transition metal salt (e.g., calcium chloride) to an aqueous dispersion of silica nanoparticles having a pH of 2.5 to 3.3 to form a metal-silicon oxide material. The subterranean well treatment additive can then loaded onto the nanoparticle. If a mixture of metal salts are used, a mixture of metal silica nanoparticles ($MSiO_2$ and $M^2SiO_2$, where M and $M^2$ are different and obtained from the Column 2, Column 14 or transition metal salt) can be obtained. For example, a mixture of $Ca-SiO_2$, $Mg-SiO_2$, etc. nanoparticles. In some aspects, the method can include an optional step of removing the water from the aqueous solution removing water from the aqueous solution to precipitate the nanoparticles, preferably at a temperature of 70° C. to 150° C. for 0.1 hours to 24 hours. In preferred aspects, the solution can contain 0.2 to 5 wt. % $SiO_2$ and 0.18 to 0.22 wt. % metal (preferably, Ca). Loading the additive can include contacting the nanoparticle with the well treatment additive to form a mixture and sonicating the mixture at a pH of 9 to 10 to form the nanoparticle having the well treatment additive loaded therein. Notably, the nanoparticle formation and/or loading can be done in the absence of a surfactant and/or piperazine-N,N'-bis(2-ethanesulfonic acid) (PIPES). The metal salt solution can have a pH of 5.5 to 6.5, preferably 6. The nanoparticle contains at least 0.1 wt. % of the additive based on the total weight of loaded nanoparticle, preferably 2 to 15 wt. %.

Another aspect of this invention is a subterranean well treatment composition containing the nanoparticles of the present invention, and methods of treating the well with such composition by injecting it into a well or a subterranean formation (e.g., a reservoir or an uncased well). The composition may be added to other drilling fluids, e.g., saltwater or other aqueous fluids. The composition can include aqueous, nonaqueous medium, or mixtures thereof (e.g., salt water, an acidic aqueous solution, low sulfate seawater, an aqueous sodium carbonate solution, a surfactant, or other flush fluid, oil phase, suspension, non-aqueous delivery, or any combination thereof).

In some embodiments, a method of delivering an additive to a subterranean formation is disclosed. The method can include obtaining a composition that includes the additive loaded nanoparticles described above and throughout the specification and providing the additive loaded nanoparticle composition to a subterranean formation. The additive loaded nanoparticle composition can be provided to a drilling fluid (mud fluid) or an enhanced oil recovery fluid.

Also disclosed in the context of the present invention are aspects 1-42. Aspect 1 is a nanoparticle comprising a releasable hydrocarbon formation and/or well treatment additive attached to the nanoparticle, the nanoparticle comprising silica and at least one metal complexed to the silica, wherein the nanoparticle has a particle size of less than 300 nm, and wherein the metal is selected from a Column 2 metal, a transition metal, or both. Aspect to is the nanoparticle of aspect 1, wherein the metal is calcium (Ca). Aspect 3 is the nanoparticle of any one of aspects 1 to 2, wherein the particle size is 0.1 nm to 300 nm, preferably 10 to 250 nm. Aspect 4 is the nanoparticle of any one of aspects 1 to 3, wherein the hydrocarbon formation and/or well treatment additive is a scale inhibitor, a hydrate inhibitor, a clay stabilizer, a bactericide, a salt substitute, a relative permeability modifier, a sulfide scavenger, a corrosion inhibitor, a corrosion inhibitor intensifier, a pH control additive, a surfactant, a breaker, a fluid loss control additive, an asphaltene inhibitor, a paraffin inhibitor, a chelating agent, a foamer, a defoamer, an emulsifier, a demulsifier, an iron control agent, a solvent, a friction reducer, or any combination thereof. Aspect 5 is the nanoparticle of aspect 4, wherein the additive is a scale inhibitor. Aspect 6 is the nanoparticle of aspect 5, wherein the scale inhibitor is an organic molecule having a carboxylic acid, a polycarboxylic acid, aspartic acid, maleic acid, sulfonic acid, phosphonic acid, or a phosphate ester group or salts thereof. Aspect 7 is the nanoparticle of aspect 5, wherein the scale inhibitor comprises a phosphonic acid functionality, preferably the scale inhibitor can include or is diethylenetriamine penta (methylene phosphonic acid) (DTPMPA), bis(hexamethylenetriaminepenta(methylenephosphonic acid)) (BHMTPMP), ethylene diamine tetra (methylene phosphonic acid) (EDTMPA), amino trimethylene phosphonic acid (ATMP), polyamino polyether methylene phosphonic acid (PAPEMP), hydroxyethylamino-di(methylene phosphonic acid) (HEMPA), or a combination thereof, more preferably DTPMPA or HEMPA, or both, and/or wherein the scale inhibitor includes 1-hydroxy ethylidene-1,1-diphosphonic acid (HEDP), 2-phosphonobutane-1,2,4-tricarboxylic acid (PBTC), 2-hydroxy phosphonoacetic acid (HPAA), or any combination thereof. Aspect 8 is the nanoparticle of any one of aspects 1 to 7, wherein the hydrocarbon formation and/or well treatment additive is impregnated within the nanoparticle. Aspect 9 is the nanoparticle of any one of aspects 1 to 8, wherein the additive is DTPMPA and the nanoparticle comprises $SiO_2$—Ca. Aspect 10 is the nanoparticle of any one of aspects 1 to 9, wherein the hydrocarbon formation and/or well treatment additive is chemically bound to the nanoparticle through an ionic bond, a covalent bond, a hydrogen bond, a Van der Walls interaction, or by adsorption onto the particle. Aspect 11 is the nanoparticle of any one of aspects 1 to 10, wherein the additive is capable of being released from the nanoparticle in a controlled manner over an extended period of time such as at least for 500 days, at least for 1000 days, at least for 2000 days, at least for 500 days to 2500 days, or at least for 500 days to 2000 days after application.

Aspect 12 is a nanoparticle, having a formula of:

$$A/[Si_xM_z]O_n$$

where Si and M are in the crystal lattice structure of the nanoparticle, M is a Column 2 metal, a transition metal, a Column 14 metal, or any combination thereof; x is 0.03 to 3, z is 0.01 to 0.4, and n is determined by the oxidation states of the metals Si, M; and A is a hydrocarbon formation or well treatment additive capable of being released from the nanoparticle, wherein the nanoparticle has a particle size of less than 300 nm. Aspect 13 is the nanoparticle of aspect 12, wherein M is beryllium (Be), magnesium (Mg), calcium (Ca), strontium (Sr), barium (Ba) and radium (Ra). Aspect 14 is the nanoparticle of aspect 12, wherein M is calcium (Ca). Aspect 15 is the nanoparticle of any one of aspects 12 to 14, wherein A is a scale inhibitor, a hydrate inhibitor, a clay stabilizer, a bactericide, a salt substitute, a relative permeability modifier, a sulfide scavenger, a corrosion inhibitor, a corrosion inhibitor intensifier, a pH control additive, a surfactant, a breaker, a fluid loss control additive, an asphaltene inhibitor, a paraffin inhibitor, a chelating agent, a foamer, a defoamer, an emulsifier, a demulsifier, an iron control agent, a solvent, a friction reducer, or any combination thereof. Aspect 16 is the nanoparticle of aspect 15, wherein the additive is a scale inhibitor. Aspect 17 is the nanoparticle of aspect 16, wherein the scale inhibitor is an organic molecule having a carboxylic acid, a polycarboxylic acid, aspartic acid, maleic acid, sulfonic acid, phosphonic acid, or a phosphate ester group or salts thereof. Aspect 18 is the nanoparticle of aspect 17, wherein the scale inhibitor comprises a phosphonic acid functionality, preferably wherein the scale inhibitor is or comprises diethylenetriamine penta(methylene phosphonic acid) (DTPMPA), bis (hexamethylenetriaminepenta(methylenephosphonic acid)) (BHMTPMP), ethylene diamine tetra (methylene phosphonic acid) (EDTMPA), amino trimethylene phosphonic acid (ATMP), polyamino polyether methylene phosphonic acid (PAPEMP), hydroxyethylamino-di(methylene phosphonic acid) (HEMPA), or a combination thereof, more preferably DTPMPA or HEMPA, or both, and/or wherein the scale inhibitor includes 1-hydroxy ethylidene-1,1-diphosphonic acid (HEDP), 2-phosphonobutane-1,2,4-tricarboxylic acid (PBTC), 2-hydroxy phosphonoacetic acid (HPAA), or any combination thereof. Aspect 19 is the nanoparticle of any one of aspects 12 to 18, wherein A is impregnated within the nanoparticle. Aspect 20 is the nanoparticle of any one of aspects 12 to 18, wherein A is chemically bound to the nanoparticle through an ionic bond, a covalent bond, a hydrogen bond, a Van der Walls interaction, or by adsorption onto the particle. Aspect 21 is the nanoparticle of any one of aspects 12 to 20, wherein the particle size is 1 nm to 300 nm, preferably 10 nm, to 250 nm, or more preferably 50 nm to 200 nm. Aspect 22 is the nanoparticle of any one of aspects 12 to 21, wherein the additive is capable of being released from the nanoparticle in a controlled manner over an extended period of time such as at least for 500 days, at least for 1000 days, at least for 2000 days, at least for 500 days to 2500 days, or at least for 500 days to 2000 days after application.

Aspect 23 is a well treatment composition comprising a plurality of the nanoparticles of any one of aspects 1 to 22.

Aspect 24 is the well treatment composition of aspect 23, wherein the composition is a fluid. Aspect 25 is the well treatment composition of any one of aspects 23 to 24, wherein the well-treatment composition is a controlled-release composition capable of releasing the well treatment additive over an extended period of time, such as at least for 500 days, at least for 1000 days, at least for 2000 days, at least for 500 days to 2500 days, or at least for 500 days to 2000 days after application. Aspect 26 is the well treatment composition of any one of aspects 23 to 25, further comprising water, salt water, an acidic aqueous solution, low sulfate seawater, an aqueous sodium carbonate solution, a surfactant, or other flush fluid, or any combination thereof. Aspect 27 is a method of treating a hydrocarbon formation or a wellbore comprising injecting the composition of any one of aspects 23 to 26 into a wellbore, the wellbore intersecting a subterranean formation. Aspect 28 is the method of aspect 27, wherein treating is squeeze treating, continuous treating, or spear treating the subterranean well formation or wellbore. Aspect 29 is the method of any one of aspects 27 to 28, wherein the additive is released from the nanoparticle over an extended period of time.

Aspect 30 is a method for producing the nanoparticle of any one of aspects 1 to 11, the method comprising: (a) adding a metal salt solution comprising a Column 2 metal salt, Column 14 metal salt, or a transition metal salt, or a mixture thereof to an aqueous silica solution having a pH of 2.5 to 3.3 to form a suspension comprising metal-$SiO_2$ nanoparticles where the metal is a Column 2 metal, Column 14 metal or a transition metal; and (b) loading a hydrocarbon formation or well treatment additive into the nanoparticle. Aspect 31 is the method of aspect 30, wherein the steps (a) and (b) are absent a surfactant and/or piperazine-N,N'-bis (2-ethanesulfonicacid). Aspect 32 is the method of any one of aspects 30 to 31, wherein the method further comprises removing water from the aqueous solution, preferably at a temperature of 70° C. to 150° C. for 0.1 hours to 24 hours. Aspect 33 is the method of aspect 32, wherein the $SiO_2$ content is 0.2 to 5 wt. % and the metal content is 0.18 to 0.22 M. Aspect 34 is the method of any one of aspects 30 to 33, wherein step (c) comprises contacting the nanoparticle with the well treatment additive to form a mixture and sonicating the mixture at a pH of 9 to 10 to form the nanoparticle having the well treatment additive loaded therein. Aspect 35 is the method of any one of aspects 30 to 34, wherein the solution of the Column 2 metal salt or the transition metal salt has a pH of 5.5 to 6.5, preferably 6. Aspect 36 is the method of any one of aspects 30 to 35, wherein the nanoparticle in step (c) contains at least 0.1 wt. % of the additive based on the total weight of loaded nanoparticle, preferably 2 to 15 wt. %. Aspect 37 is the method of any one of aspects 30 to 36, wherein the metal salt solution is an aqueous solution of calcium chloride. Aspect 38 is the method of any one of aspects 30 to 37, wherein the water is removed by evaporation. Aspect 39 is the method of aspect 38, wherein the evaporation is conducted at a temperature of 70° C. to 100° C.

Aspect 40 is a method of delivering an additive to a subterranean formation comprising providing a composition comprising (i) the nanoparticle of any one of aspects 1 to 22 to a subterranean formation or (ii) the well treatment composition of any one of aspects 23-27 to a subterranean formation. Aspect 41 is the method of aspect 40, wherein providing the composition to the subterranean formation comprises delivering the composition to a drilling fluid. Aspect 42 is the method of aspect 40, wherein providing the composition to the subterranean formation comprises delivering the composition to an enhanced oil recovery fluid.

The following includes definitions of various terms and phrases used throughout this specification.

The term "capable of being released" as it relates to the subterranean well treatment additive means that, under conditions of use, e.g., in a subterranean well, the well treatment additive dissociates, hydrolyzes, is chemically unbound, or becomes otherwise separated from the nanoparticle and available for use for its intended purpose, e.g., a scale inhibitor in a subterranean well.

The term "controlled release over an extended period of time" relates to the release rate of the subterranean well treatment additive from the nanoparticles and means that the additive is, in an environment of use such as, e.g., a subterranean well, released from the nanoparticle over a longer period of time than if the additive were not adsorbed or otherwise affixed to the to the nanoparticle of the invention.

The terms "formation fluid" or "formation fluids" includes liquids and gases present in a formation. Non-limiting examples, of formation fluid include hydrocarbon liquids and gases, water, salt water, sulfur and/or nitrogen containing hydrocarbons, inorganic liquids and gases and the like.

The terms "about" or "approximately" are defined as being close to as understood by one of ordinary skill in the art. In non-limiting embodiment, the terms are defined to be within 10%, preferably within 5%, more preferably within 1%, and most preferably within 0.5%.

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting close" or "reducing" or "preventing" or "avoiding" or any variation of these terms, when used in the claims and/or the specification includes any measurable decrease or complete inhibition to achieve a desired result. The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The nanoparticles and methods of the present invention can "comprise," "consists essentially of," or "consists of" particular elements, ingredients, components, compositions, etc. disclose throughout the specification. With respect to the transitional phrase "consisting essentially of," in one non-limiting aspect a basic and novel characteristic of the nanoparticles of the present invention are their ability to deliver a controllable release well treatment additive over an extended period of time during use (e.g., in subterranean wells).

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, on recited elements or method steps.

Other objects, features and advantages of the present invention will become apparent from the following figures, a detailed description, and examples. It should be understood, however, that the figures, detailed description, and examples, while indicating specific embodiments of the invention, are given by way of illustration only, and are not meant to be a limiting. Additionally, it is contemplated that changes and modifications within the spirit and scope of the invention will become apparent to those skilled in the art from this detailed description.

DETAILED DESCRIPTION OF THE INVENTION

Figure 1:
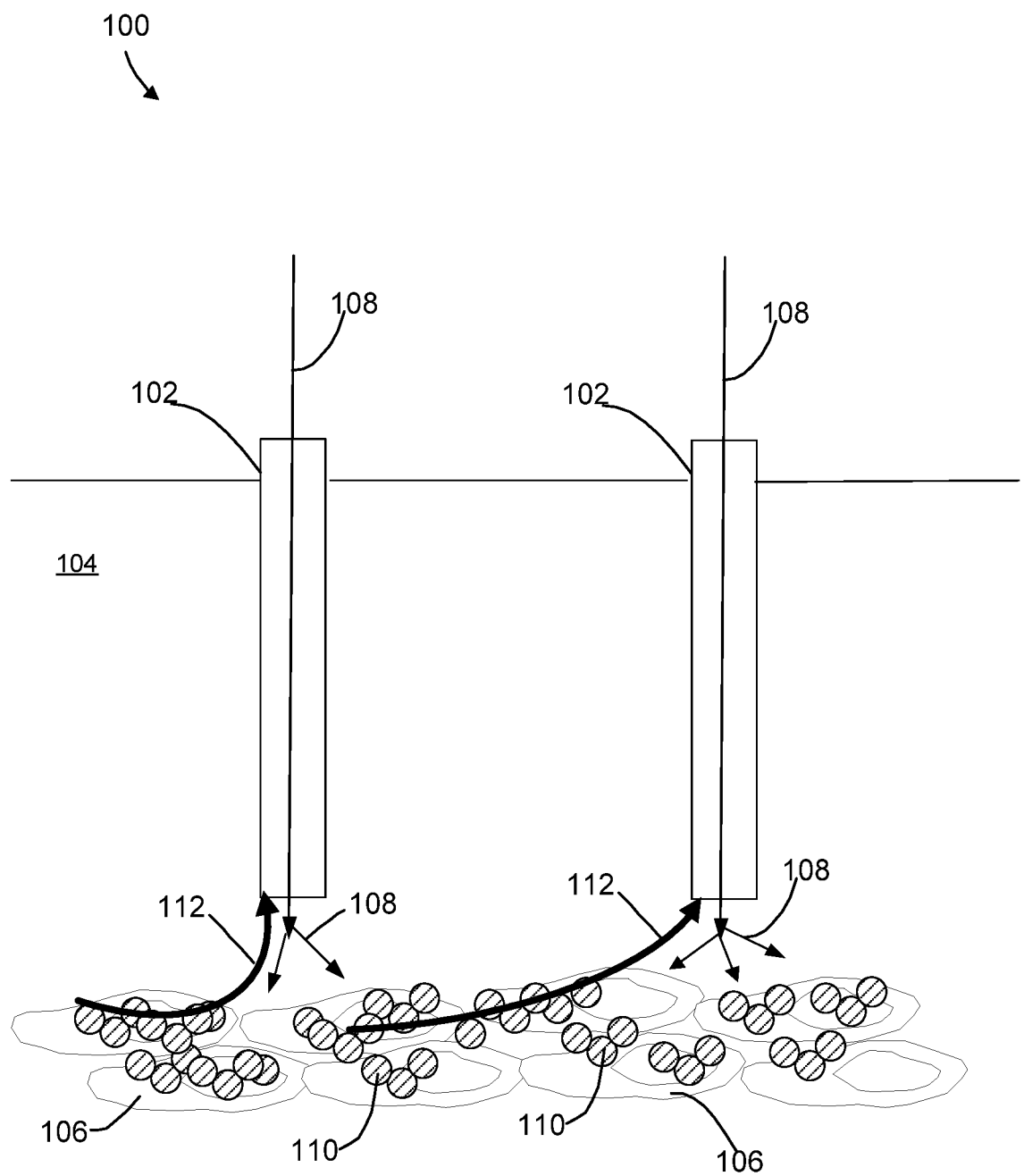
FIG. 1 is a schematic of a method to treat a subterranean well using the nanoparticles of the present invention loaded with a subterranean treatment additive.

A discovery has been made which provides nanoparticulate carriers for subterranean treatment additives (e.g., well treatment additives). These nanoparticulate carriers can provide extended or sustained release of a subterranean treatment additive in an environment of use, e.g., in a subterranean oil, gas well, water well, or any subterranean reservoir. Notably, the average particle size of the nanoparticles are less than 300 nm, which provides the advantage of minimal formation damage when injected in a subterranean formation, a well bore, or a well. Controlled release of such additives over an extended period of time decreases or eliminates the need to retreat wells or subterranean formations (e.g., hydrocarbon reservoirs) with such additives, providing a cost and labor savings, and less environmental risks. The discovery is premised on bonding or adsorbing the additive to nanoparticles of silica based nanoparticles that include a Column 2 metal or a transition metal. These nanoparticulate carriers can be prepared by: (1) contacting aqueous dispersion a silica nanoparticles with an aqueous solution of a Column 2, Column 14, or transition metal salt or alkoxide at a pH of 2.5 to 3.3 to form a metal/silica nanoparticle and (2) loading the subterranean treatment additive (e.g., well additive) into the nanoparticle. Without wishing to be bound by theory it is believed that the Column 2 metal, Column 14 metal, or the transition metal is incorporated in the Si—O lattice.

The invention provides an elegant way to provide a cost- and labor-effective methods to deliver subterranean treatment additives such as scale inhibitors to wells so that they release the additive over a long period of time, in a manner that reduces or eliminates the need to retreat wells with such additives. The invention also provides effective methods to deliver additives to fluids used to produce fluids (e.g., oil and gas) from subterranean formations. For example, delivery of additives to drilling fluid additives (mud additives), enhanced oil recovery (EOR) fluids, or the like.

These and other non-limiting aspects of the present invention are discussed in further detail in the following sections.

A. Nanoparticles with a Subterranean Treatment Additive

The subterranean treatment additive containing nanoparticle ("loaded nanoparticle") of the present invention is a SiM oxide (SiMO) nanoparticle, where M is a having the subterranean treatment additive connected to the nanoparticle such that small, but effective, amounts of subterranean treatment additive are removed from the nanoparticle over a period of time. The loaded nanoparticles are discussed in further detail in the following sections.

1. Metal Silica Oxide Nanoparticulate Carrier

The nanoparticles of the present invention can include Si and a Column 2, Column 14, or transition metal. These metals can form the crystal lattice of the mixed metal oxide. M metals can include a Column 2 metal, or a transition metal of the Periodic Table. In some embodiments, the nanoparticle is a Si and a Column 2 metal, preferably Ca. In other embodiments, the nanoparticle is a Si and transition metal. Non-limiting examples of Column 2 metals include beryllium (Be) magnesium (Mg), calcium (Ca), strontium (Sr), barium (Ba), or radium (Ra). Non-limiting examples of transition metals (Columns 3-12) include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), darmstadtium (Ds), roentgenium (Rg) and copernicum (Cn). In some embodiments, Column 14 metals of tin (Sn), lead (Pb), Germanium (Ge) can be used.

The nanoparticles of the present invention can have the general formula:

$$A/[Si_xM_z]O_n$$

where A is a subterranean well treatment additive capable of being released from the nanoparticle, and Si and M is in the crystal lattice structure of the nanoparticle. M can be Column 2 metal, an optional Column 14 metal, or a transition metal, or a combination thereof. $M^2$ and $M^3$ can each independently be beryllium (Be), magnesium (Mg), calcium (Ca), strontium (Sr), barium (Ba) and radium (Ra), or combinations thereof. In a particular embodiment, Ca is particularly preferred. The molar amounts of each metal are designated by x and z, with x ranging from 0.03 to 3, and z ranging from 0.01 to 0.4. The molar amount of oxygen is represented by n. In some embodiments, the nanoparticle includes hydrogen ions. The molar amount of oxygen is determined by the oxidation states of the metals Si and M. If hydrogen is present, the molar amount of hydrogen is determined by hydrolysis of metals Si and M in the crystal lattice. According to the present invention, x can range from 0.03 to 3, 0.5 to 1, 2 to 3, or 0.03, 0.05, 0.1, 0.15, 1.0, 1.05, 1.1, 1.15, 2.0, 2.05, 2.1, 2.15, 3.0 or any value or range there between, and z can range from 0 to 0.4, preferably from 0.1 to 0.3, and more preferably from 0.1 to 0.2, or 0.01, 0.05, 0.1, 0.15, 0.2, 0.25, 0.3, 0.35, 0.4 or any value or range there between, n can range from 1 to 10, more preferably from 2 to 8, and most preferably from 3 to 5, or 1, 2, 3, 4, 5, 6, 7, 8, 9, 10, or any value or range there between. Without wishing to be bound by theory, it is believed that the amount of hydrogen can be related to the degree of hydrolysis. In fully hydrolyzed crystal, which is the hydroxide phase, the molar concentration of O is equal to that of hydrogen.

The nanoparticles can have an atomic ratio of metals ranging from about 1 to about 99. For example, in one aspect the atomic ratio of a Si/M can range from 20-80, or 40-75, 90:5, 50:25, 50:30, 40:50 or any ratio there between. The ratio of oxygen to the metals will depend primarily on the oxidation state of the metals and can vary accordingly.

The nanoparticles of the present invention have physical properties that can contribute to the controlled release of the subterranean well treatment additive over an extended period of time. The nanoparticles can have an average diameter of from 0.1 nm to 300 nm, preferably 10 nm to 200 nm in diameter, and more preferably from 5 to 175 nm, 2 to 12 nm or 5 nm to 10 nm, or 2 nm, 3 nm, 4 nm, 5 nm, 6 nm, 7 nm, 8 nm, 9 nm, 10 nm, 11 nm, 12 nm or any range or value there between as measured by laser particle size and TEM.

2. Subterranean Treatment Additive

Subterranean treatment additives are additives that can effect or inhibit performance of a material or fluid in a subterranean well, reservoir, or the like. The subterranean treatment additive can be separated from the nanoparticle in response to a stimuli (e.g., formation fluid, water, or pressure). The additive can be bound to the nanoparticle, e.g., chemically via an ionic bond, and/or be adhered to the nanoparticle. Non-limiting examples of the nanoparticle bonding to the additive include an ionic bond, a covalent bond, a hydrogen bond, a Van der Walls interaction. Adhesion to the nanoparticle can be through absorption or adsorption onto the particle.

Non-limiting examples of a subterranean treatment additive include a scale inhibitor, a hydrate inhibitor, a clay stabilizer, a bactericide, a salt substitute, a relative permeability modifier, a sulfide scavenger, a corrosion inhibitor, a corrosion inhibitor intensifier, a pH control additive, a surfactant, a breaker, a fluid loss control additive, an asphaltene inhibitor, a paraffin inhibitor, a chelating agent, a foaming agent, a defoamer, an emulsifier, a demulsifier, an iron control agent, a solvent, a friction reducer, or any combination thereof. A scale inhibitor is a particularly preferred subterranean well treatment additive. The scale inhibitor can be a molecule, preferably an organic molecule, having a functionalized group that can bind to the particle. Non-limiting examples of functionalized groups include a carboxylic acid, a polycarboxylic acid, aspartic acid, maleic acid, sulphonic acid, phosphonic acid, or a phosphate ester group or salts thereof. A preferred scale inhibitor can include a phosphonic acid group. Another preferred scale inhibitor can include a sulfonated polycarboxylic acid group (e.g., SPCA). In some particularly preferred aspects, the scale inhibitor can include or can be diethylenetriamine penta (methylene phosphonic acid) (DTPMPA), bis(hexamethylenetriaminepenta(methylenephosphonic acid)) (BHMTPMP), ethylene diamine tetra (methylene phosphonic acid) (EDTMPA), amino trimethylene phosphonic acid (ATMP), polyamino polyether methylene phosphonic acid (PAPEMP), hydroxyethylamino-di(methylene phosphonic acid) (HEMPA), or a combination thereof, more preferably DTPMPA or HEMPA, or both. In some aspects, DTPMPA is the most preferred scale inhibitor, which is available from various commercial sources. In some instances, the scale inhibitor can include 1-hydroxy ethylidene-1,1-diphosphonic acid (HEDP), 2-phosphonobutane-1,2,4-tricarboxylic acid (PBTC), 2-hydroxy phosphonoacetic acid (HPAA), or any combination thereof.

B. Methods of Making Nanoparticles

The nanoparticles of the present invention can be prepared by contacting silica nanoparticles with a metal salt solution at a pH of 2.5 to 3.3 to form a metal/silica nanoparticle. The subterranean treatment additive can then be added to the metal/silica nanoparticle using impregnation or coating methods. These methods are described in more detail below and in the Examples section.

In step one of the method, an aqueous solution of silica or a silicon alkoxide, an M salt or alkoxide can be obtained. The aqueous solution can contain from 0.01 to 10 wt. % Si, 0.1 to 7.5 wt. % Si, 1.0 to 5 wt. % Si, or 2 to 3 wt. % Si, 0.01 to 1 wt. % M, from 0.1 to 0.5 wt. % M, or from 0.25 to 0.3 wt. % M, where M is a Column 2 metal, a transition metal, or a Column 14 metal. The pH of the aqueous silica dispersion or solution can be 2.5 to 3.3, or 2.5, 2.6, 2.7, 2.8, 2.9, 3.0, 3.1, 3.2, or 3.3, or any value or range there between. In a preferred aspect, the pH is approximately 3.0.

Non-limiting examples of alkoxides that can bond to Si and/or M include methoxide, ethoxide, propoxide, isopropoxide, s-butoxide, i-propoxide, 2-ethylhexoxide, t-butoxide, hexafluoro-t-butoxide, tri-sec butoxide or combinations thereof. In some embodiments, nanoparticulate $SiO_2$ is used.

The metal (M) can be provided in varying oxidation states as metallic, oxide, hydrate, or salt forms typically depending on the propensity of each metals stability, reactivity, and/or physical/chemical properties, and are preferably provided as water-soluble salts or alkoxides. The metals in the preparation of the nanoparticles can be provided in stable oxidation states as complexes with monodentate, bidentate, tridentate, or tetradendate coordinating ligands such as for example iodide, bromide, sulfide, thiocyanate, chloride, nitrate, azide, acetate, fluoride, hydroxide, oxalate, water, isothiocyanate, acetonitrile, pyridine, ammonia, ethylenediamine, 2,2'-bipyridine, 1,10-phenanthroline, nitrite, triphenylphosphine, cyanide, or carbon monoxide. Various commercial sources can be used to obtain the metal salts or alkoxides. A non-limiting example of a commercial source of the above mentioned metals and metal oxides is Millipore (U.S.A.). M is preferably provided as an inorganic or organic metal salt, especially water soluble metal salts such as halide salts, e.g., chlorides, bromides, iodides, fluorides; nitrates, nitrites, sulfates, etc. Organic metal salts may include acetates, carbonates, citrates, and the like. Preferably M is calcium, and are preferably provided as the chloride salt thereof, e.g., calcium chloride ($CaCl_2$). The aqueous solution of Column 2 metal salt, Column 14, or the transition metal salt can have a pH of 5.5 to 6.5, or 5.5, 5.7, 5.8, 5.9, 6.0, 6.1, 6.2, 6.3, 6.4, 6.5, or any range or value there between. The pH, in one preferred instance, is about 6. Addition of the metal salt solution to the silica dispersion or solution raises the initial pH of the solution.

In some embodiments, the dispersion, or if alkoxides are used, can be reduced in volume using known removal/concentration methods. Reduction in the amount of water and/or alkoxide can precipitate the nanoparticles from the solution. For example, evaporation at atmospheric or reduced pressure until nanoparticles are formed in the aqueous solution. In some embodiments, the water and/or alkoxide can be removed at a temperature of from 60° C. to 150° C., more preferably from 70° C. to 100° C., or 60° C., 65° C., 70° C., 75° C., 80° C., 85° C., 90° C., 95° C., 100° C., 105° C., 110° C., 120° C., 125° C., 130° C., 135° C., 140° C., 145° C., or 150° C., or any value or range there between at atmospheric pressure. In some embodiments, the water and/or alkoxide is evaporated at a temperature of 70° C. at atmospheric pressure. The precipitation step can for about a period of from for 0.1 hours to 48 hours, more preferably from about 1 hour to about 24 hours, most preferably from about 1.5 to about 10 hours.

The subterranean treatment additive can be loaded onto the metal/silica nanoparticle using known impregnation and/or coating methods. By way of example, the subterranean treatment additive can be mixed with the metal/silica nanoparticle to form a mixture. The mixture can be agitated (e.g., sonicated) to form an additive/metal-silica nanoparticle of the present invention having the subterranean treatment additive loaded therein or thereon. In a preferred aspect of the invention, the nanoparticle of the present invention can contain at least 0.1 to 70 wt. % or 80 wt. %, or 0.1 wt. %, 0.5 wt. %, 1 wt. %, 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. % of the well treatment additive. Without wishing to be bound by theory, it is believed that the subterranean well treatment additive can be chemical bound to the metal/silica nanoparticle through an ionic bond, a covalent bond, a hydrogen bond, a Van der Walls interaction or by absorption or adsorption onto the particle. In some embodiments, the additive is loaded into the interstices of the lattice structure. In some embodiments, the nanoparticles can be separated from the anions of the salt precursor material (e.g., Cl$^-$). In some embodiments, addition of the additive at a temperature of from 60° C. to 150° C., more preferably from 70° C. to 100° C., or 60° C., 65° C., 70° C., 75° C., 80° C., 85° C., 90° C., 95° C., 100° C., 105° C., 110° C., 120° C., 125° C., 130° C., 135° C., 140° C., 145° C., or 150° C., or any value or range there between at atmospheric pressure. In some embodiments, the water and/or alkoxide is evaporated at a temperature of 70° C. at atmospheric pressure. Addition of the additive can raise the pH of dispersion from raises the pH of the solution to 9 to 10. The final pH can be 9, 9.1, 9.2, 9.3, 9.4, 9.5, 9.6, 9.7, 9.8, 9.9, or 10, or any range or value there between. The loading step can for about a period of from for 0.1 hours to 48 hours, more preferably from about 1 hour to about 24 hours, most preferably from about 1.5 to about 10 hours. The final concentration of $SiO_2$ content is 0.2 to 5 wt. % in the solution and the metal content is 0.18 to 0.22 M. In some embodiments, the addition of the additive can be done using a flow through vessel in combination with sonication. In some embodiments, the sonicator is a field sonicator.

The additive is capable of being released from the nanoparticle in a controlled manner over an extended period of time, e.g., for at least 10 days, 1 month, 6 months, 1 year, 5 years, 10 years or 10 years. In particularly preferred embodiments, at least some of the additive is released for at least 2000 days after application.

C. Subterranean Well Treatment Compositions

The loaded nanoparticles of the present invention can be provided to a treatment site as individual nanoparticles or as a subterranean treatment composition (e.g., a subterranean well treatment composition). By way of example, a subterranean well treatment composition can include a fluid (e.g., an aqueous liquid) that contains a plurality of loaded nanoparticles (e.g., a slurry). The composition can be a controlled-release composition capable of releasing the subterranean treatment additive over an extended period of time. These compositions can be prepared by admixing the loaded nanoparticles of the invention with a fluid that will be injected into the well. Non-limiting examples of a subterranean treatment composition fluid include water, salt water (KCl) an acidic aqueous solution, low sulfate seawater, an aqueous sodium carbonate solution, a surfactant, or other flush fluid, or can be a nonaqueous fluid (e.g., based on oil, natural gas or petroleum based fluids), or can be a combination of nonaqueous and aqueous fluids.

D. Methods of Treating Subterranean Wells or Wellbores

The loaded nanoparticles or loaded nanoparticle composition can be delivered to the subterranean formation using a variety of methods, pumping, pressuring injection, or the like. In some embodiments, a squeeze or continuous treatment method is used. A method of treating a subterranean formation, well, or wellbore is depicted in FIG. 1. In addition to treating wells, the loaded nanoparticles can be used to deliver additives to the subterranean formation for other purposes (e.g., deliver mud additives to drilling fluids or enhanced oil recovery fluids, or the like). Wells 102 can intersect the subterranean formation, and can be injection wells, production wells, water wells, or the like. As shown, the wells 102 intersect as vertical wells, but can be horizontal wells. Wells 102 can be uncased wellbores, cased wellbores or the like. In method 100, prior to production from well 102, the loaded nanoparticles or composition of the present invention can be injected into one or more wells 102, flow through the well and into subterranean formation 104 as shown by arrow 108. The loaded nanoparticles 110 can be deposited on rock formation 106 in the subterranean formation. Known drilling equipment (e.g., oil, gas, or water drilling equipment) can be used to inject the subterranean well treatment compositions into wells 102 (e.g., using a squeeze method, continuous method, or spear method). The nanoparticles can adsorb to the formation rock 106 and be the additive loaded on the nanoparticle can be returned to the well 102 in an amount effective to perform the necessary function (e.g., inhibit scale) when the well is put into production. As shown in the FIG. 1, fluid can flow over the rock as shown by arrow 112 and dissolve or desorb a small amount of treatment additive from the nanoparticle. The formation fluid containing the treatment additive then flows into the well. The treatment additive can coat or interact with the well materials or fluid in the well to treat the well (e.g., inhibit scale). By way of example, the treatment additive can be a scale inhibitor and contact of the formation fluid with the scale inhibitor dissolves or desorbs an effective amount of the scale inhibitor from the nanoparticle and carries the scale inhibitor into the well. The scale inhibitor can interact with the well material and/or fluids in the well to inhibit scale from forming on the inside portion of the wall of well 102. The composition of the nanoparticle and adherence of the additive to the nanoparticle allows an effective amount of additive to be released from the nanoparticle over an extended period of time (e.g., greater than 5 years).

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

(Nanoparticle Preparation)

Figure 2:
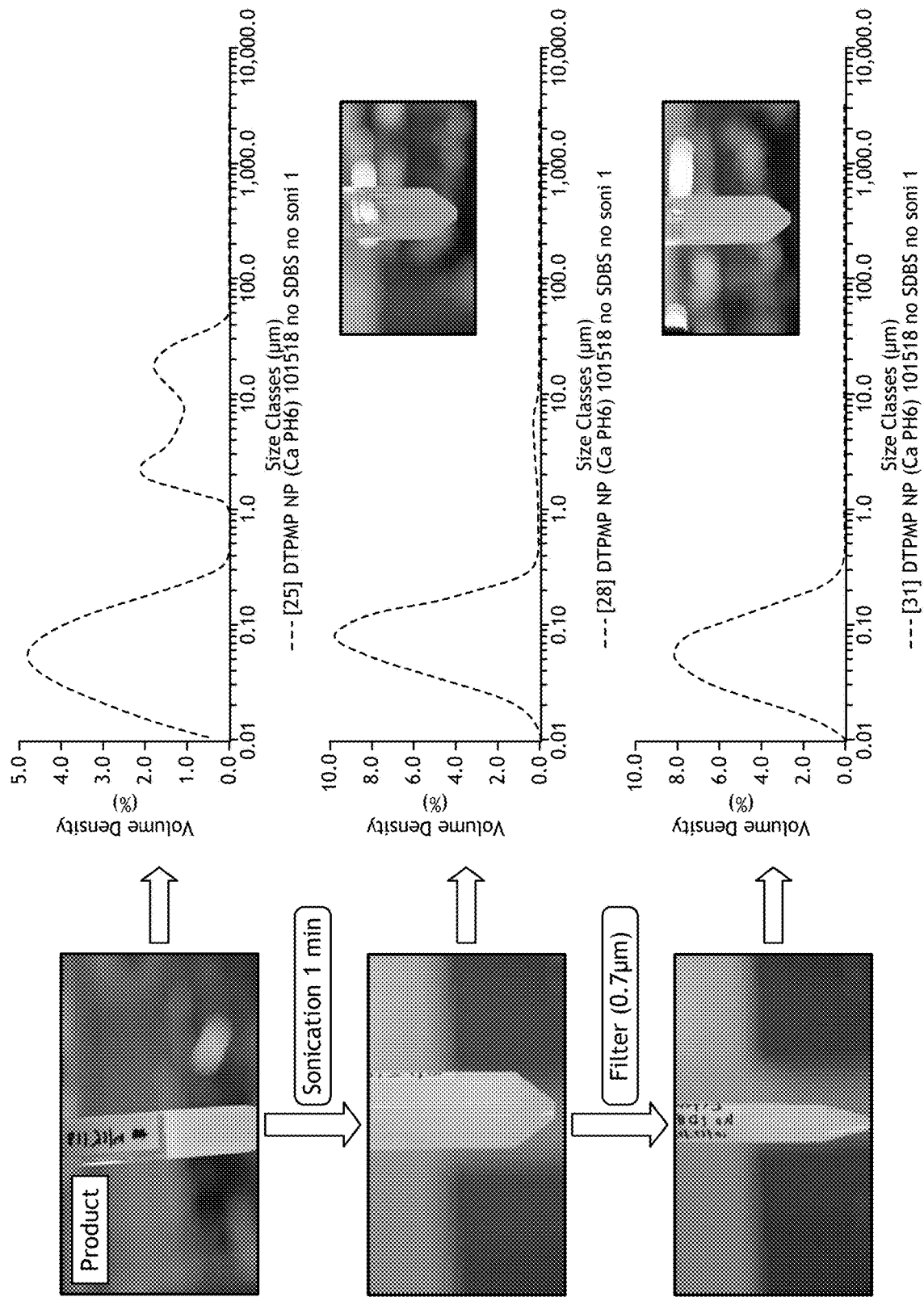
FIG. 2 is a graph of nanoparticle size in micrometers versus volume density in percent with and without sonication.

Calcium chloride ($CaCl_2$, Sigma Aldrich) was dissolved in deionized water (180 mL) to form a 1 M solution having a pH of 6.0. A dispersion of $SiO_2$ (silica nanofluid, 5% wt/wt, 18.75 mL) was obtained. The calcium chloride solution was added dropwise with vigorous stirring to the silica nanofluid. The pH of the Ca—$SiO_2$ colloid solution was adjusted to 3 by addition of hydrochloric acid. At or around pH of 3, the Ca—$SiO_2$ nanoparticles have a highly positively surface charge, which dispersed themselves in the slurry to form stable colloids. Basic DTPMP solution (17.2 mL) was added to the Ca—$SiO_2$ solution using a syringe pump at a flow of 10 mL/hr. The DTPMP/Ca—$SiO_2$ solution was sonicated for 1 to 5 min at a pH of 7.4. The sonicated particles had average particle sizes of 185 to 190 nm. The total energy delivered to the sample was around 3300 J. FIG. 2 shows the DTPMP/Ca—$SiO_2$ nanoparticles size before and after sonication and filtering. Large particles were observed in the product without sonication, but with 1 minute of sonication most of those agglomerations were reduced into nano meter size particles. By filtering the solution through a 0.7 um filter, it was possible to get rid of the few large particles. After one day, the sonicated sample did not show any considerable precipitation and therefore, the filtering step can be excluded from the synthesis. The amount of DTPMP loaded in the nanoparticle was 4.4 wt. % as determined by ICP. The solution had a final pH of 7.34, was translucent and light amber in color.

Example 2

(Squeeze Experiment Using the DTPMP/Ca—$SiO_2$ and Comparative DTPMP)

Figure 3:
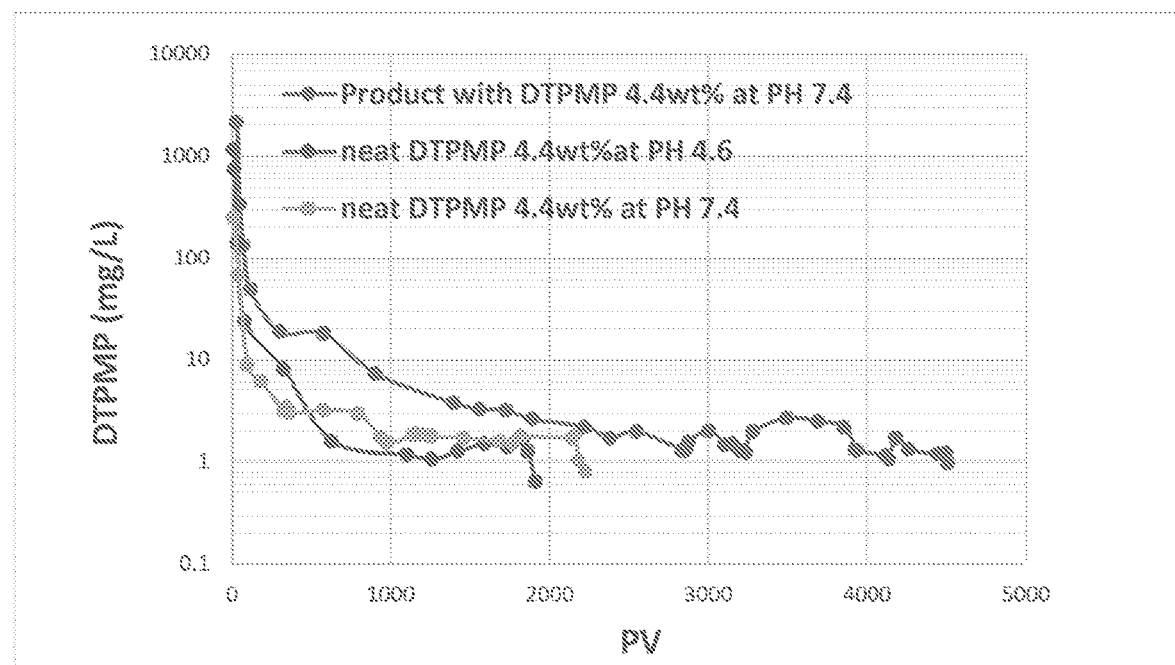
FIG. 3 is a graph of flow back performance of the nanoparticle composition of the present invention in packed glass columns.
Figure 4:
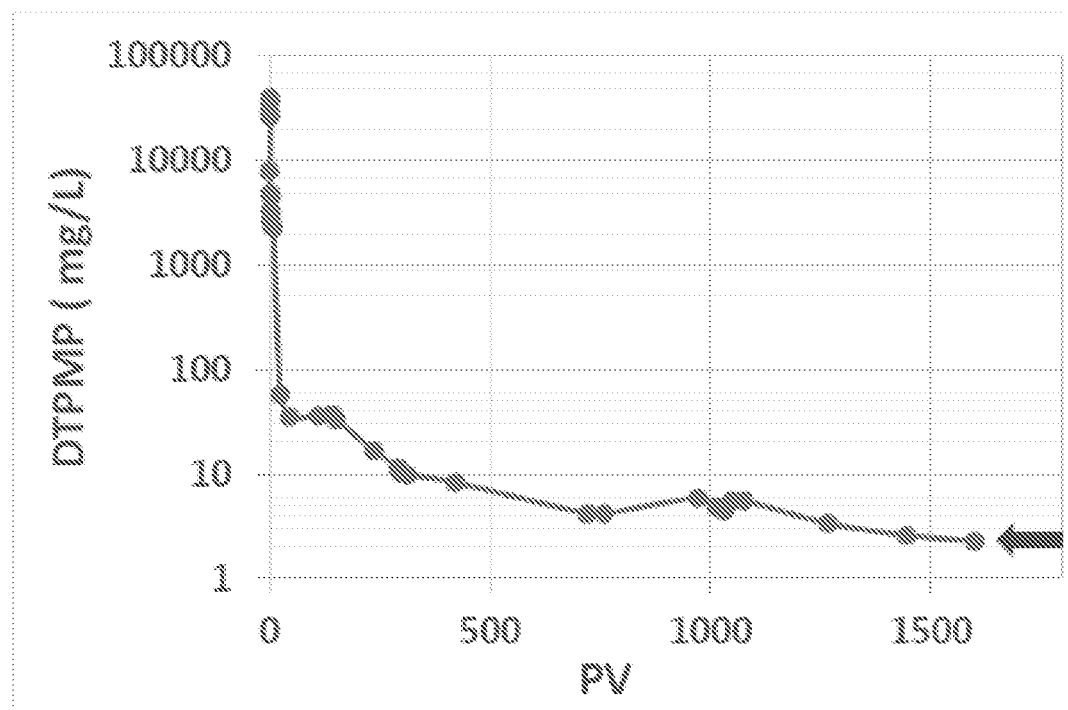
FIG. 4 is a graph of flow back performance of the nanoparticle composition of the present invention in intact core.
Figure 5:
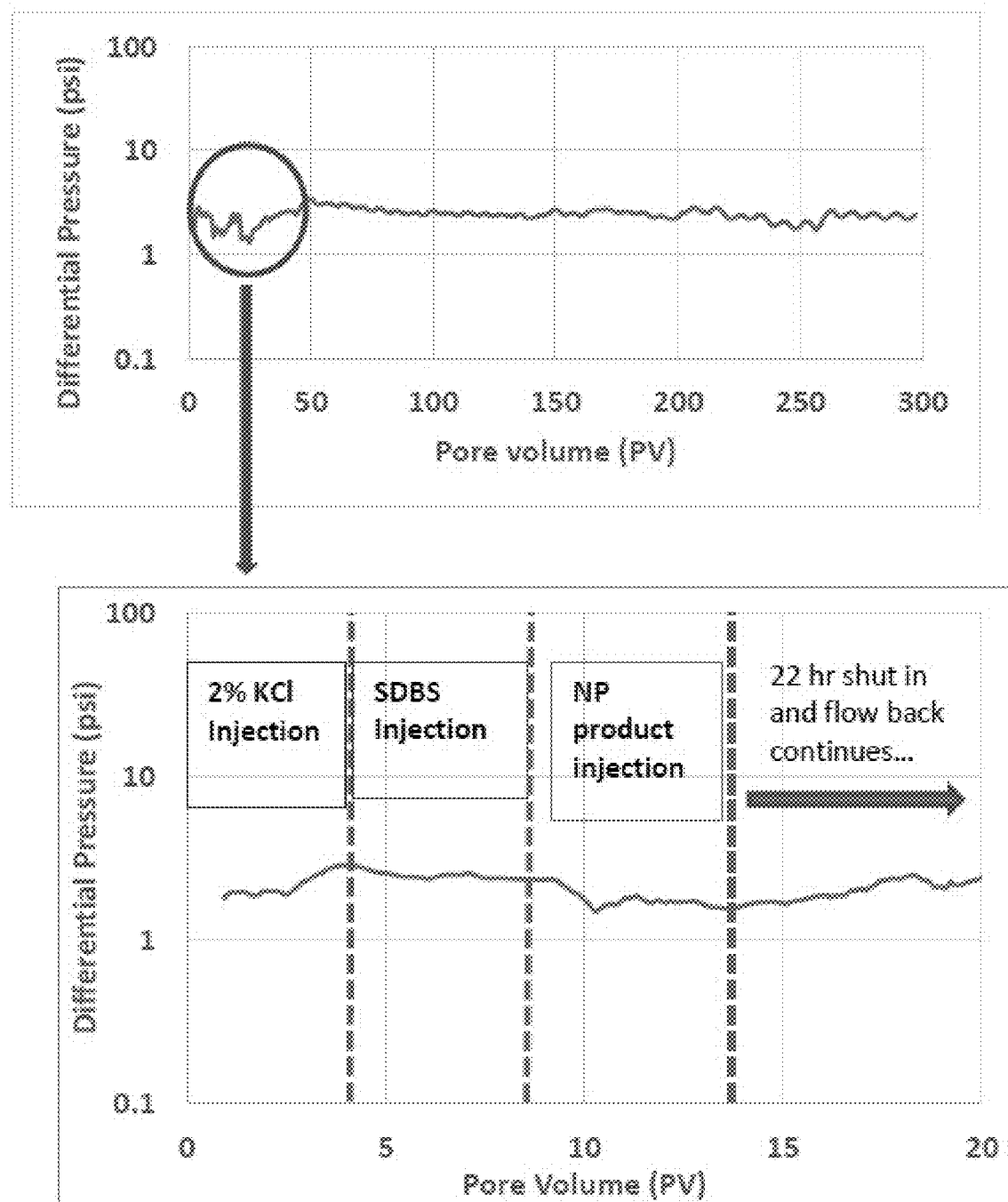
FIG. 5 are graphs of flow back performance of the nanoparticle composition of the present invention in intact core, with KCl injection, and SDBS injection, and the present invention injection.
Figure 6:
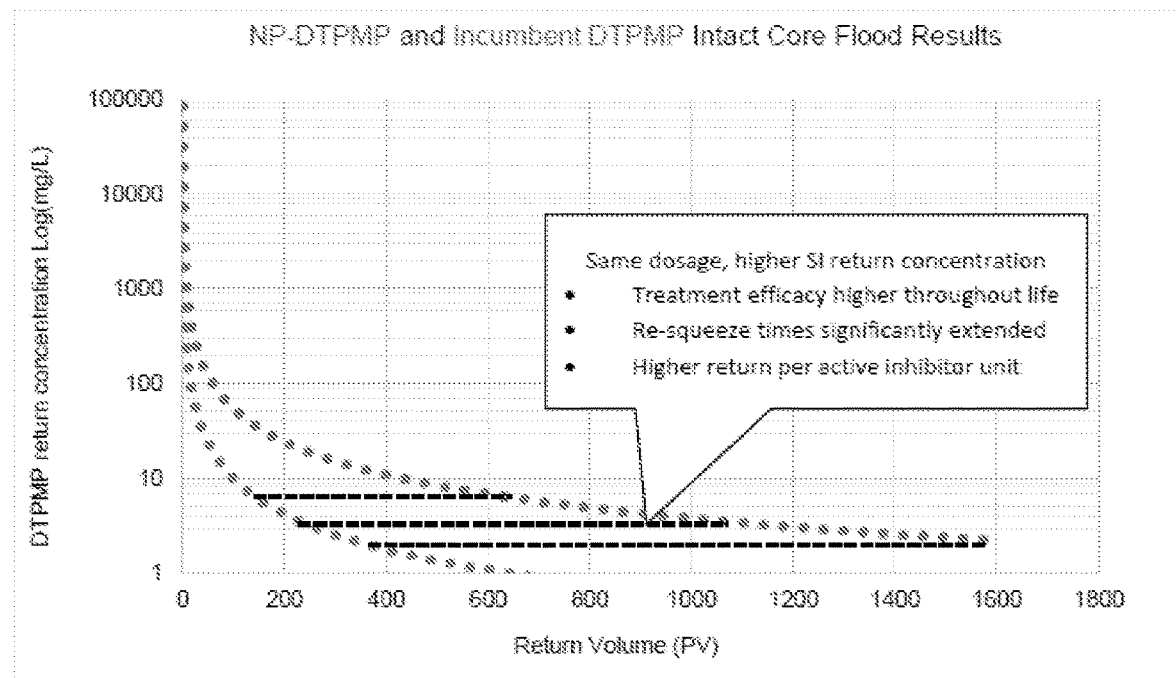
FIG. 6 is a graph of intact core flood performance of the nanoparticle composition of the present invention with DTPMP as the additive and incumbent DTPMP.

A squeeze experiment was carried out using a crushed core packed glass column at 70° C. Back pressure was maintained at 100 psi. The threshold value of DTPMP to stop the flowback was set as 1 ppm. The Ca-Phosphonate NP product shows 4513 pore volumes and the life time of the product is more than 200% the return of DTPMP compared to the neat DTPMP at Ph 7. During the experiment no pressure build-up and no blocking in the crushed core or in the tubing were observed. Table 1 lists the pore volume comparison for the three experiments performed with nanoparticle of the present invention and DTPMP at various pHs. FIG. 3 shows flow back performance in packed glass columns for the nanoparticle of the present invention and neat DTPMP at various pHs. FIG. 4 shows flow back performance in intact core. The differential pressure was plotted during the injection steps and is shown below (See, FIG. 5). No pressure increase was observed when injecting the product vs KCl. FIG. 6 shows intact core flood squeeze experiments of the nanoparticle of the present invention and incumbent DTPMP. The nanoparticle of the present invention at the same dosage had higher SI return concentration, higher efficacy throughout the treatment life, re-squeeze times were significantly extended and higher return per active inhibitor unit.

TABLE 1

| Product | PV (at DTPMP >1 ppm) |
| --- | --- |
| NP product with DTPMP 4.4 wt % at pH 7.4 | 4513 |
| neat DTPMP 4.4 wt % at pH 4.6 | 1860 |
| neat DTPMP 4.4 wt % at pH 7.4 | 2180 |

Example 3

(Stability of DTPMP/Ca—$SiO_2$)

The nanoparticle of Example 1 was exposed to 80° C., 150° C., and −17° C. for 24 hours. The produce was allowed to freeze and was then kept at −17° C. for 25 hours. pSA and pH were measured after the sample reached room temperature. No precipitation or change in particle size was observed. Also no change in particle size or Ph was observed. Tables 2-4 list the results. The product was subjected to a 7 wt. % solution of KCl. Table 5 lists the testing results. No precipitation or change in particle size was observed, showing product stability up to 7 wt. % KCl. The product was subjected to various pHs. It was determined that the product was stable between 7.19 and 8.65. The product was subjected to low and high shear stresses generated by immersion blenders for one minute. No precipitation or change in particle size or pH was observed as shown in Table 6. Emulsions were prepared using 5%, 10% and 30% V/V of water collected during the intact core squeeze experiments (see Example 2) of NP product and DTPMP with crude oil (API gravity @ 60° F.: 34.9). The solutions were emulsified with a low shear immersion blender. Emulsions were allowed to separate for 3 minutes. The nanoparticle product of the present invention did not impact emulsion separation. In addition, the observed nanoparticle of the present invention concentration in flow back from intact corefloods was negligible, and thereby no impart form the nanoparticle of the present invention is expected under typical production circumstances.

TABLE 2

| 80° C. experiment (24 hr in 80° C.) | Before | After |
| --- | --- | --- |
| PSA | 16-155 nm | 16-155 nm |
| pH | 7.25 | 7.04 |

TABLE 3

| 150° C. experiment (24 hr in 150° C.) | Before | After |
| --- | --- | --- |
| PSA | 16-155 nm | 18-177 nm (7% peak intensity) and 11-33 μm (0.2% peak intensity) |
| pH | 7.25 | 7.12 |

TABLE 4

| −17° C. experiment (24 hr in −17° C.) | Before | After |
| --- | --- | --- |
| PSA | 16-155 nm | 18-156 nm |
| pH | 7.25 | 7.22 |

TABLE 5

| 7% KCl | Before (No KCl) | After (7% KCl) |
| --- | --- | --- |
| PSA | 16-155 nm | 16-155 nm |
| pH | 7.25 | 7.10 |

TABLE 6

|  | Before Shear Stress | Low Shear (1 min) | High Shear (1 min) |
|---|---|---|---|
| PSA (nm) | 16-155 | 14-155 | 14-155 |
| pH | 7.82 | 7.82 | 7.82 |

The invention claimed is:

1. An aqueous solution comprising a plurality of nanoparticles dispersed throughout the aqueous solution, the nanoparticles comprising:
a hydrocarbon formation and/or well treatment additive chemically bound to the nanoparticles and releasable from the nanoparticles, silica, and at least one metal selected from a Column 2 metal, a Column 14 metal, a transition metal, or any combination thereof,
wherein the nanoparticles have an average particle size of less than 300 nm,
wherein the aqueous solution does not include a surfactant, and
wherein the nanoparticles do not precipitate out of the aqueous solution when subjected to a temperature of −20° C. to 200° C. and a pH of 5 to 9.

2. The aqueous solution of claim 1, wherein the metal is calcium (Ca).

3. The aqueous solution of claim 1, wherein the average particle size is 0.1 nm to 300 nm.

4. The aqueous solution of claim 1, wherein the hydrocarbon formation and/or well treatment additive is a scale inhibitor, a hydrate inhibitor, a clay stabilizer, a bactericide, a salt substitute, a relative permeability modifier, a sulfide scavenger, a corrosion inhibitor, a corrosion inhibitor intensifier, a pH control additive, a breaker, a fluid loss control additive, an asphaltene inhibitor, a paraffin inhibitor, a chelating agent, a foamer, a defoamer, an emulsifier, a demulsifier, an iron control agent, a solvent, a friction reducer, or any combination thereof.

5. The aqueous solution of claim 4, wherein the additive is a scale inhibitor, and wherein the scale inhibitor is an organic molecule having a carboxylic acid, a polycarboxylic acid, aspartic acid, maleic acid, sulfonic acid, phosphonic acid, or a phosphate ester group or salts thereof.

6. The aqueous solution of claim 4, wherein the additive is a scale inhibitor, and wherein the scale inhibitor includes 2-phosphonobutane-1,2,4-tricarboxylic acid (PBTC).

7. The aqueous solution of claim 5, wherein the scale inhibitor is a polymer comprising a phosphonic acid functionality.

8. The aqueous solution of claim 1, wherein the hydrocarbon formation and/or well treatment additive is impregnated within the nanoparticles.

9. The aqueous solution of claim 1, wherein the additive is diethylenetriamine penta(methylene phosphonic acid) and the nanoparticles comprise $SiO_2$—Ca.

10. The aqueous solution of claim 1, wherein the hydrocarbon formation and/or well treatment additive is chemically bound to the nanoparticles through an ionic bond, a covalent bond, or a hydrogen bond.

11. The aqueous solution of claim 1, wherein the additive is capable of being released from the nanoparticles in a controlled manner for 500 days to 2000 days after application.

12. The aqueous solution of claim 1, wherein zinc is not present in the nanoparticles.

13. The aqueous solution of claim 1, wherein the average particle size is 50 nm to 200 nm.

14. A well treatment composition comprising the aqueous solution of claim 1.

15. A method of treating a hydrocarbon formation or a wellbore comprising injecting the composition of claim 14 into a wellbore, the wellbore intersecting a subterranean formation.

16. A method for producing the aqueous solution of claim 1, the method comprising:
(a) adding a metal salt solution comprising a Column 2 metal salt, Column 14 metal salt, or a transition metal salt, or a mixture thereof to an aqueous silica solution having a pH of 2.5 to 3.3 to form a suspension comprising metal-$SiO_2$ nanoparticles where the metal is a Column 2 metal, Column 14 metal or a transition metal; and
(b) loading a hydrocarbon formation or well treatment additive into the nanoparticle.

17. A method of delivering an additive to a subterranean formation comprising providing a composition comprising the aqueous solution of claim 1 to a subterranean formation.

* * * * *